United States Patent
Wakui (10) Patent No.: US 12,450,727 B2
(45) Date of Patent: Oct. 21, 2025

(54) IMAGE PROCESSING APPARATUS, IMAGE PROCESSING METHOD, AND MEDIUM THAT OBTAINS A DIFFERENCE IN COLOR INFORMATION AT CORRESPONDING POSITIONS BETWEEN A COMPOSITE IMAGE AND A PRINT IMAGE

(71) Applicant: CANON KABUSHIKI KAISHA, Tokyo (JP)

(72) Inventor: Miki Wakui, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 355 days.

(21) Appl. No.: 18/193,733

(22) Filed: Mar. 31, 2023

(65) Prior Publication Data
US 2023/0342911 A1 Oct. 26, 2023

(30) Foreign Application Priority Data
Apr. 22, 2022 (JP) .................. 2022-070951

(51) Int. Cl.
*G06T 7/90* (2017.01)
*G06T 7/00* (2017.01)
*G06T 7/30* (2017.01)

(52) U.S. Cl.
CPC ............. *G06T 7/001* (2013.01); *G06T 7/30* (2017.01); *G06T 7/90* (2017.01); *G06T 2207/10024* (2013.01); *G06T 2207/30144* (2013.01)

(58) Field of Classification Search
CPC .. G06T 7/001; G06T 7/30; G06T 7/32; G06T 7/33; G06T 7/337; G06T 7/90
USPC ......................................................... 382/112
See application file for complete search history.

(56) References Cited

U.S. PATENT DOCUMENTS

| | | | |
|---|---|---|---|
| 2007/0165257 A1* | 7/2007 | Owaku | H04N 1/6033 |
| | | | 358/1.9 |
| 2015/0221077 A1* | 8/2015 | Kawabata | G06T 7/337 |
| | | | 382/141 |

FOREIGN PATENT DOCUMENTS

| | | | |
|---|---|---|---|
| JP | 2020-006603 A | | 1/2020 |
| JP | 2023067715 A | * | 5/2023 |

* cited by examiner

*Primary Examiner* — Jamares Q Washington
(74) *Attorney, Agent, or Firm* — Venable LLP (57) ABSTRACT

An image processing apparatus including one or more memories storing instructions and one or more processors that execute the instructions to obtain a plurality of print images obtained by reading each of a plurality of print products, to evaluate a difference between the plurality of print images, and to set an exclusion region in inspection of a print product based on a result of the evaluation. The one or more processors execute the instructions to obtain a difference in color information at corresponding positions between a composite image of the plurality of print images and one of the plurality of print images as a feature amount indicating the magnitude of the difference.

18 Claims, 5 Drawing Sheets

IMAGE PROCESSING APPARATUS, IMAGE PROCESSING METHOD, AND MEDIUM THAT OBTAINS A DIFFERENCE IN COLOR INFORMATION AT CORRESPONDING POSITIONS BETWEEN A COMPOSITE IMAGE AND A PRINT IMAGE

CROSS-REFERENCE TO PRIORITY APPLICATION

This application claims the benefit of Japanese Patent Application No. 2022-070951, filed Apr. 22, 2022, which is hereby incorporated by reference herein in its entirety.

BACKGROUND OF THE INVENTION

Field of the Invention

The present invention relates to an image processing apparatus, an image processing method, and a medium, and, in particular, relates to a technique for inspecting a print product.

Description of the Related Art

A print product output by a print apparatus may have an abnormality (also referred to as a "defect") due to undesired attachment of dirt, or the like, and thus, inspection for such an abnormality is performed in order to ensure the quality of the print product. Since inspection performed by an inspection worker through visual examination takes a long time and is expensive, techniques for automating inspection processes have been developed in recent years.

In order to improve productivity in printing print products, it is desirable to suppress over-detection of an abnormality in a print product in inspection processing (in which a print product that is not abnormal is determined as being abnormal). For example, Japanese Patent Laid-Open No. 2020-006603 proposes, in inspection of print products that include a variable image that differs in each print product and a common image that is common to a plurality of print products, inspecting the common image while excluding a region where the variable image is printed from an inspection target. For this reason, Japanese Patent Laid-Open No. 2020-006603 also proposes that the user specifies a variable region that is excluded from an inspection target, on a user interface (UI) panel. In Japanese Patent Laid-Open No. 2020-006603, in such a configuration, a result of reading each print product is compared with a result of reading a specific print product whose quality is already confirmed to not be a problem, thereby keeping an abnormality from being detected in the variable image, and improving the yield rate of print products.

SUMMARY OF THE INVENTION

According to an embodiment of the present invention, an image processing apparatus comprises one or more memories storing instructions and one or more processors that execute the instructions to obtain a plurality of print images obtained by reading each of a plurality of print products, to evaluate a difference between the plurality of print images, and to set an exclusion region in inspection of a print product based on a result of the evaluation.

According to an embodiment of the present invention, an image processing apparatus comprising one or more memories storing instructions and one or more processors that execute the instructions to obtain a plurality of print images obtained by reading each of a plurality of print products, each of the plurality of print products being obtained by printing a common object on a medium on which an image having been printed in advance, and to detect a region whose position relative to the common object varies among the plurality of print images as a region of the image having been printed in advance.

According to another embodiment of the present invention, an image processing method comprises obtaining a plurality of print images obtained by reading each of a plurality of print products, evaluating a difference between the plurality of print images, and setting an exclusion region in inspection of a print product based on a result of the evaluation.

According to still another embodiment of the present invention, a non-transitory computer-readable medium stores a program executable by a computer to perform a method comprising obtaining a plurality of print images obtained by reading each of a plurality of print products, evaluating a difference between the plurality of print images, and setting an exclusion region in inspection of a print product based on a result of the evaluation.

Further features of the present invention will become apparent from the following description of exemplary embodiments (with reference to the attached drawings).

DESCRIPTION OF THE EMBODIMENTS

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

A print product may include a portion in which a variation in the image is likely to be detected. There are cases where, for example, a print product is generated by performing printing on a pre-printed sheet printed in advance (pre-printing). When a print product is inspected in such a case, there is the possibility that an abnormality in a pre-printed region will be over-detected due to misalignment between a pre-printed image and a printed image although visually-allowable print quality has been achieved. The method described in Japanese Patent Laid-Open No. 2020-006603 does not specifically deal with printing on a pre-printed sheet. In addition, a complicated designating operation is required for excluding a pre-printed image from an inspection target through a user operation.

According to an embodiment of the present invention, in inspection of a print product, it is possible to suppress over-detection of an abnormality in a portion in which a variation in an image is likely to be detected, for example an abnormality in a pre-printed image, with a less burden on the user.

Figure 1:
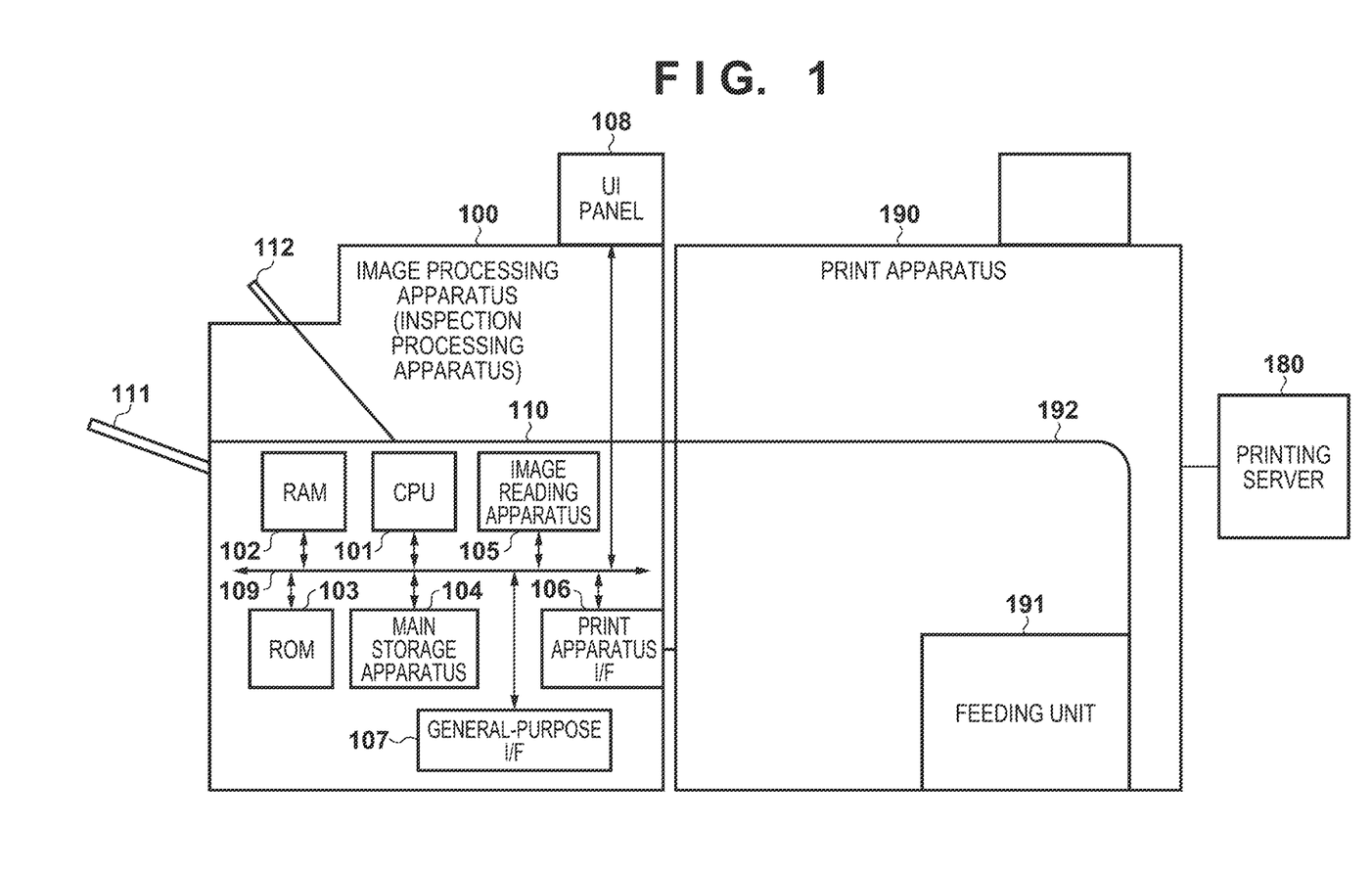
FIG. 1 is a diagram showing an example of a configuration of a print system according to an embodiment of the present invention.

FIG. 1 shows an example of an entire configuration of a print system that includes an image processing apparatus 100 according to an embodiment of the present invention, and, in which, a print product is output and inspected. The print system according to the present embodiment includes the image processing apparatus 100, a printing server 180, and a print apparatus 190. The printing server 180 generates a print job of a document to be printed, and inputs the print job to the print apparatus 190. This print job can include electronic data such as image data of the document to be printed. Hereafter, this electronic data may be referred to as "print data". The print apparatus 190 forms an image on a recording medium (for example, paper) based on the print job input from the printing server 180. In this example, print paper is used as a recording medium. The print apparatus 190 includes a feeding unit 191, and the user can set print paper in the feeding unit in advance. When a print job is input to the print apparatus 190, the print apparatus 190 conveys the print paper set in the feeding unit 191, along a conveyance path 192, while forming an image that is based on the print job, onto a surface or the two surfaces of the print paper, and sends the print paper to the image processing apparatus 100.

The image processing apparatus 100 according to an embodiment of the present invention inspects a print product. In this example, the image processing apparatus 100 performs inspection processing for checking whether or not there is an abnormality in print paper on which an image was formed by the print apparatus 190, and that was transmitted through the conveyance path 192, in other words, a print product. In this manner, the image processing apparatus 100 functions as an inspection processing apparatus. The image processing apparatus 100 can inspect a print product based on comparison between a print image obtained by reading the print product and a reference image indicating an allowable print result at each position. Specifically, the image processing apparatus 100 can determine that there is an abnormality in the print image at a position at which a difference between the print image and the reference image is great.

The image processing apparatus 100 includes a CPU 101, a RAM 102, a ROM 103, a main storage apparatus 104, and an image reading apparatus 105. The image processing apparatus 100 further includes an interface (I/F) 106 to a print apparatus, a general-purpose interface (I/F) 107, a user interface (UI) panel 108, and a main bus 109. The image processing apparatus 100 further includes a conveyance path 110 for print products, which is connected to the conveyance path 192 of the print apparatus 190, an output tray 111 for discharging a print product in which no abnormality has been found and that has passed inspection, and an output tray 112 for discharging a print product in which an abnormality has been found and that has failed inspection.

The CPU 101 is a processor, and can perform overall control of the units in the image processing apparatus 100. The RAM 102 can function as a main memory, a work area, or the like, for the CPU 101. The ROM 103 stores a group of programs that are executed by the CPU 101. The main storage apparatus 104 stores an application that is executed by the CPU 101, data that is used for image processing, and the like. By a processor such as the CPU 101 executing a program stored in a memory such as the RAM 102, the ROM 103, or the main storage apparatus 104, it is possible to realize the functions of the units shown in FIG. 2, and the like, to be described later.

The image reading apparatus (scanner) 105 can read, on the conveyance path 110, one surface or the two surfaces of a print product sent from the print apparatus 190, and obtain it as image data (print image). The print apparatus I/F 106 is connected to the print apparatus 190. The print apparatus I/F 106 is used for communication with the print apparatus 190, and the print apparatus I/F 106 can be used to synchronize a timing of processing on a print product with the print apparatus 190 and to transmit/receive an operating state to/from the print apparatus 190, via the print apparatus I/F 106. The general-purpose I/F 107 is an interface for connection to an external apparatus. The general-purpose I/F 107 is a serial bus interface compliant with USB, IEEE1394, or the like, and can be used for the user to take away data such as a log. The UI panel 108 is a user interface of the image processing apparatus 100. The UI panel is a liquid crystal display, for example, and can display the current status or settings of the image processing apparatus 100 in order to notify the user of such data. In addition, the user interface (UI) panel 108 can include a touch panel display or button, and can accept an instruction from the user via these input devices. The main bus 109 connects the units of the image processing apparatus 100 to one another.

In addition, although not shown in FIG. 1, the image processing apparatus 100 or the units of the print system can operate in accordance with an instruction from the CPU 101. It is possible to, for example, operate the conveyance paths 110 and 192 in synchronization with each other, and to switch the output destination of a print product between the output tray 111 and the output tray 112 in accordance with an inspection result.

As a whole, the image processing apparatus 100 performs inspection processing, which will be described later, based on image data of a print product sent from the print apparatus 190 and read by the image reading apparatus 105, while conveying the print product on the conveyance path 110. If the print product passes inspection, the print product is conveyed to the output tray 111, otherwise it is conveyed to the output tray 112. In this manner, only print products that have passed inspection can be collected on the output tray 111, as print products to be delivered.

Figure 2:
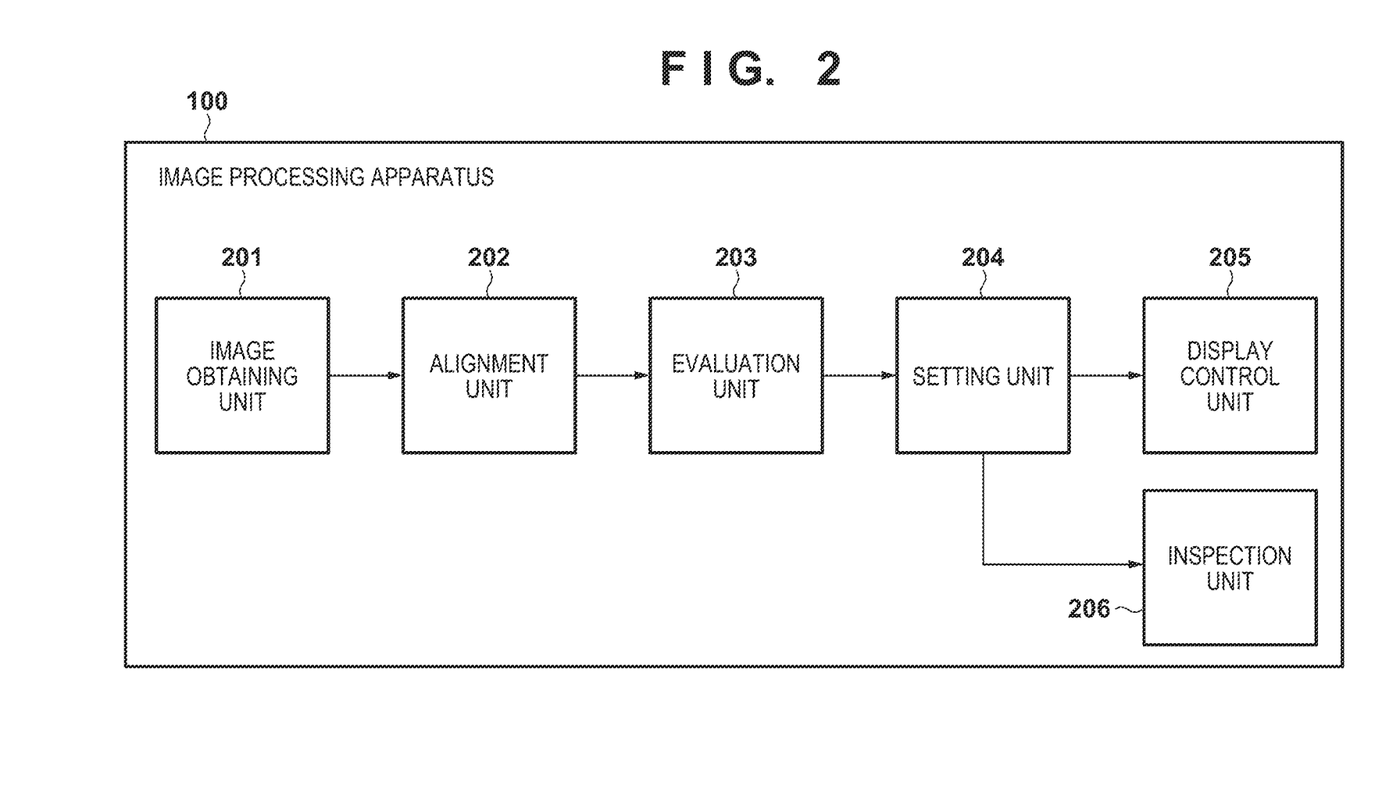
FIG. 2 is a block diagram showing an exemplary functional configuration of an image processing apparatus according to an embodiment of the present invention.

FIG. 2 is a diagram of functional blocks of the image processing apparatus 100 according to the present embodiment. In the present embodiment, the image processing apparatus 100 sets an inspection exclusion region that is excluded from print product inspection, by evaluating a difference between a plurality of print images obtained by reading each of a plurality of print products. As described above, the functions of the image processing apparatus 100 shown in FIG. 2 can be realized by a computer that includes a processor and a memory, but some or all of the functions of the image processing apparatus 100 may be realized by dedicated hardware. In addition, an image processing apparatus according to an embodiment of the present invention may be constituted by a plurality of information processing apparatuses connected to each other via a network, for example.

An image obtaining unit 201 obtains a plurality of print images obtained by reading each of a plurality of print products. Each of the print products can include a common object. The plurality of print products may be obtained by printing the same image, for example. In addition, each of the plurality of print products may be a print product obtained by printing a common object onto a medium on which an image has been printed in advance. In the following example, a print product is obtained by the print apparatus 190 performing printing on a pre-printed sheet in accordance with a print job. Each of the plurality of print products is obtained by printing the same image onto the same type of pre-printed sheets. The image obtaining unit 201 obtains a scanned image of a print product which has been read by the image reading apparatus 105, as a print image. The obtained print image is held in the main storage apparatus 104.

An alignment unit 202 aligns a plurality of print images with each other. The alignment unit 202 can align the print images held in the main storage apparatus 104. The alignment unit 202 can align the plurality of print images based on a common object. Print data included in a print job may include an alignment mark, for example. In this case, the plurality of print products and the plurality of print images include a common alignment mark, and the print images can be aligned with each other based on this alignment mark. The alignment unit 202 may perform alignment based on an image other than such an alignment mark.

An evaluation unit 203 evaluates the difference between a plurality of print images. The evaluation unit 203 can evaluate a local difference at each position between the plurality of print images. The evaluation unit 203 compares the plurality of print images held in the main storage apparatus 104, and can thus calculate a feature amount indicating variation of pixel values between the plurality of print images, for each pixel, for example.

In this example, the evaluation unit 203 evaluates difference between respective portions of a plurality of print images, the respective positions of the portions relative to a common object being the same. Specifically, the evaluation unit 203 can evaluate the difference between the plurality of print images aligned with each other by the alignment unit 202 based on the common object. As described above, when an object is printed on a pre-printed sheet, there is the possibility that the positions of the pre-printed image and the object relative to each other will vary. In this case, when alignment is performed based on the object, the position of pre-printed image varies between print images. As described above, by the evaluation unit 203 evaluating the difference between the plurality of print images, it is possible to detect a region in which an image whose position varies is present, in other words, a region of the pre-printed image. Processing that is performed by the evaluation unit 203 will be described later in detail.

A setting unit 204 sets, based on a result of evaluation performed by the evaluation unit 203, an inspection exclusion region for print product inspection. The setting unit 204 can set, as an exclusion region, a region in which the magnitude of difference evaluated by the evaluation unit 203 is greater than a predetermined criterion, for example. In the following example, the setting unit 204 can generate a mask image indicating the inspection exclusion region, based on the variation of pixel values calculated by the evaluation unit 203.

A display control unit 205 displays the exclusion region set by the setting unit 204, on a display. The display control unit 205 can output the exclusion region to the UI panel 108, for example.

An inspection unit 206 inspects a print product. The inspection unit 206 can inspect an inspection target print product based on comparison between an image obtained by reading the inspection target print product and a reference image indicating an allowable print result. The reference image is a scanned image of a print product for which it has been confirmed that there is no abnormality. At this time, the inspection unit 206 can align the image of the inspection target print product with the reference image. This alignment can be performed based on a common object that is common between the reference image and the image of the inspection target print product. The inspection unit 206 can then inspect the inspection target print product based on the comparison of portions at corresponding positions in the reference image and the image of the print product.

At this time, the inspection unit 206 can inspect the inspection target print product such that inspection on the exclusion region is avoided. The inspection unit 206 can inspect a region other than the exclusion region without inspecting the exclusion region in the print image, for example. Specifically, the inspection unit 206 can inspect the print image held in the main storage apparatus 104, based on the exclusion region set by the setting unit 204, and output an inspection result. The inspection result output by the inspection unit 206 can be used for processing for switching the output destination of the print product between the output tray 111 and the output tray 112.

Note that the image of the inspection target print product may be one among the plurality of print images obtained by the image obtaining unit 201, or may also be another print image. In other words, the image obtaining unit 201 may obtain an image obtained by reading the inspection target print product, as at least one print image among the plurality of print images. For example, the image obtaining unit 201 may obtain, as a plurality of print images, images of a plurality of inspection target print products and the evaluation unit 203 may evaluate the difference between these images. On the other hand, the evaluation unit 203 may evaluate the difference between a plurality of print images of print products that are different from an inspection target print product. In this case, the inspection target print product and this plurality of print products obtained by the image obtaining unit 201 may be print products obtained by performing printing on the same type of pre-printed sheets in accordance with the same print data.

Figure 3:
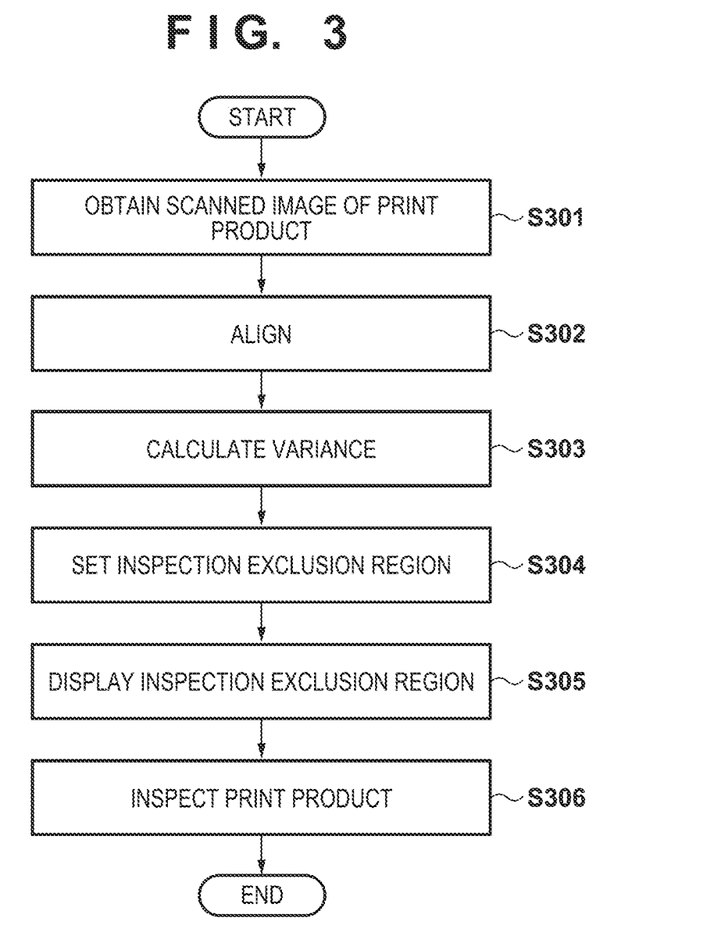
FIG. 3 is a diagram showing an example of a flowchart of an image processing method according to an embodiment of the present invention.

FIG. 3 shows a flowchart of image processing that is performed by the image processing apparatus 100 according to an embodiment of the present invention. In step S301, the image reading apparatus 105 scans a print product printed by the print apparatus 190, and generates a print image. The image obtaining unit 201 then obtains this print image, and holds it in the main storage apparatus 104. In step S301, a plurality of print products are respectively scanned until a predetermined number of print images of the print products are obtained.

In step S302, the alignment unit 202 selects a base image that is to be used as an alignment criterion, from the print images held in the main storage apparatus 104. The selecting method is not particularly limited. The alignment unit 202 extracts a feature point from a common region that is common to the selected base image and the other print images with reference to information indicating the position of the common region in which an object common to the plurality of print products is printed. As described above, this feature point may be an alignment mark, for example, or any other common point on images. In this manner, the alignment unit 202 can align the print images with the base image such that feature points extracted from the base image and from the other print images match each other.

In step S303, the evaluation unit 203 evaluates the difference for each pixel between print images, namely, the base image and the other print images aligned with each other. In order to evaluate a difference, for example, the evaluation unit 203 can evaluate the difference in color information at corresponding positions between the plurality of print images. A type of color information is not particularly limited, and the color information may be a pixel value or a luminance value of each pixel, or local contrast, for example. In the present embodiment, the evaluation unit 203 obtains, as a feature amount indicating the magnitude of a difference, the variance of color information at corresponding positions between the plurality of print images. Specifically, the evaluation unit 203 can calculate the unbiased variance of pixel values for each pixel, as a feature amount indicating a difference. A method for calculating the unbiased variance will be described later.

In step S304, the setting unit 204 compares the feature amount calculated in step S303 with a threshold set in advance, and determines that a pixel whose feature amount is greater than the threshold belongs to the inspection exclusion region. The setting unit 204 performs this determination for each pixel, and then generates a mask image indicating the inspection exclusion region. This mask image is a binary image in which the pixel values of pixels determined as belonging to the inspection exclusion region are set to zero, and the pixel value of the other pixels are set to one. The generated mask image is held in the main storage apparatus 104.

Figure 4:
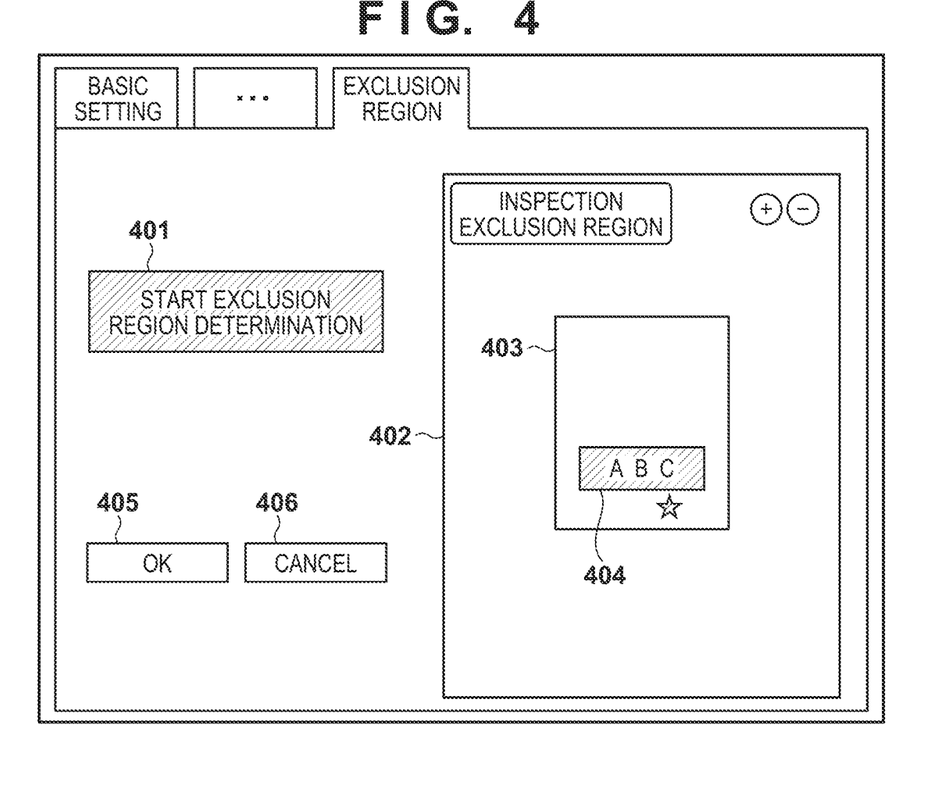
FIG. 4 is a diagram showing a display example of a user interface (UI) panel according to an embodiment of the present invention.

In step S305, the display control unit 205 outputs the mask image indicating the exclusion region and generated in step S304, to the UI panel 108. FIG. 4 shows an example of a display on the UI panel 108 according to the present embodiment. An operation button 401 is a button for instructing that the processing of steps S301 to S304 for setting an exclusion region is to be executed. A display screen 402 is a screen for displaying a mask image 403 indicating an exclusion region 404. A method for displaying an exclusion region is not limited to a method for displaying a mask image. In place of the mask image 403 or in addition to the mask image 403, the coordinates of the pixels determined as belonging to the exclusion region may be listed and displayed on the display screen 402, for example.

An operation button 405 is a button for the user to select to use the exclusion region shown on the display screen 402, and an operation button 406 is a button for the user to select not to use the exclusion region. In an embodiment, in accordance with the user confirming the exclusion region shown on the display screen 402 and pressing the operation button 405, inspection of the print products is performed in step S306 using the exclusion region set in step S304. In another embodiment, the exclusion region set in step S304 may be corrected in accordance with user input.

In step S306, the inspection unit 206 performs inspection processing on an image of inspection target print product while excluding the exclusion region set in step S304 from an inspection target, and outputs an inspection result. The inspection unit 206 can inspect the print image used in order to generate the mask image and held in the main storage apparatus 104, and, on the other hand, can also inspect an image of another print product newly obtained by the image obtaining unit 201.

As described above, the inspection unit 206 can align an images of an inspection target print product with the reference image. This alignment can be performed in a similar manner to step S302, and may be performed using an alignment mark, for example. The inspection unit 206 can then calculate a difference in color information at corresponding positions between the reference image and the image of the inspection target print product.

Here, the inspection unit 206 can determine a portion of the reference image corresponding to the exclusion region, by further aligning the mask image with the reference image and the image of the inspection target print product. As described above, the mask image is generated based on the base image and the other print images aligned with each other, and thus the base image and the mask image are aligned with each other. In addition, the reference image or the images of the inspection target print products can be aligned with the base image in a similar manner to step S302, and, thus, the mask image can be aligned with the reference image or the image of the inspection target print product, based on this alignment result.

The inspection unit 206 can then determine, as being an abnormal pixel, a pixel that is not included in the exclusion region and in which the difference in pixel value between the reference image and an image of an inspection target print product is greater than or equal to a predetermined value. In the present embodiment, it is determined that a print product corresponding to an image that includes no abnormal pixel has passed the inspection, and a print product corresponding to an image that includes an abnormal pixel has failed the inspection. Understandably, a method for determining an inspection result is not limited to such a method, and, for example, if the ratio of the number of abnormal pixels to the total number of pixels of the image of an inspection target print product is larger than or equal to a predetermined value, the inspection unit 206 may determine that the print product has failed the inspection.

Method for Calculating Unbiased Variance

Here, as an example of a method for calculating a feature amount indicating the difference between images in step S303, a method for calculating the unbiased variance of pixel values for each pixel will be described.

In n print images held in the main storage apparatus 104, the pixel value at coordinates (x, y) of an ith ($1 \leq i \leq n$) print image is indicated by (Rixy, Gixy, Bixy). In addition, the average value of pixel values (Rixy, Gixy, Bixy) in the n print images is as follows:

$$(\overline{R_{xy}}, \overline{G_{xy}}, \overline{B_{xy}}) \qquad (1)$$

At this time, unbiased variances ($S^2Rxy$, $S^2Gxy$, $S^2Bxy$) for the respective colors (R, G, B) can be calculated using the following formula. At this time, the largest value among $S^2Rxy$, $S^2Gxy$, and $S^2Bxy$ can be used as a feature amount.

$$S^2 Rxy = \frac{1}{n-1} \sum_{i=1}^{n} (R_{ixy} - \overline{R_{xy}})^2 \qquad (2)$$

$$S^2 Gxy = \frac{1}{n-1} \sum_{i=1}^{n} (G_{ixy} - \overline{G_{xy}})^2$$

$$S^2 Bxy = \frac{1}{n-1} \sum_{i=1}^{n} (B_{ixy} - \overline{B_{xy}})^2$$

As another method, unbiased variances $S^2Vxy$ of luminance values at coordinates may be calculated. In the n print images held in the main storage apparatus 104, the luminance value at coordinates (x, y) in the ith print image is denoted by Vixy, and the average value of the luminance values Vixy in the n print images is defined as follows:

$$\overline{Vxy} \quad (3)$$

At this time, the unbiased variance $S^2Vxy$ of luminance values can be calculated using the following formula, and this value can be used as a feature amount.

$$S^2 Vxy = \frac{1}{n-1} \sum_{i=1}^{n} (V_{ixy} - \overline{V_{xy}})^2 \quad (4)$$

According to the present embodiment, the setting unit 204 sets an inspection exclusion region that is excluded from print product inspection, based on evaluation on the difference between a plurality of print images performed by the evaluation unit 203, and thereby print product inspection can be omitted in a portion where the difference between the images is large. That is to say, print product inspection is performed in a portion where image variation between a plurality of print images is low and, therefore, print product inspection can be accurately performed based on comparison with a reference image. On the other hand, in a portion where image variation between a plurality of print images is great and, therefore, print product inspection cannot be easily performed based on comparison with a reference image, over-detection of an abnormality in a print product can be suppressed by omitting print product inspection. According to the present embodiment, the image processing apparatus 100 can set an exclusion region in such a manner, and, thus, it is also possible to reduce a setting burden on the user.

As a specific example, when print product inspection is performed on a pre-printed sheet, the position of a pre-printed image relative to an object printed as described above may vary. In this case, when a reference image and an image of an inspection target print product are aligned with each other based on the object printed by the print apparatus 190, the position of the pre-printed image is likely to be misaligned between the reference image and the image of the inspection target print product. However, the pre-printed image is not an image printed by the print apparatus 190, and the necessity for performing print product inspection on the pre-printed image is not very high.

In the present embodiment, the image obtaining unit 201 can obtain a plurality of print images obtained by reading each of a plurality of print products obtained by printing a common object on media on which an image has been printed in advance. The evaluation unit 203 can then detect a region in which the position of the common object differs between the plurality of print images by evaluating the difference between the plurality of print images as described above. The region detected in this manner is a region of an image printed in advance, in other words a pre-printed region. By detecting the position of the pre-printed image in this manner and omitting print product inspection of the pre-printed image, it is possible to suppress over-detection of an abnormality in the print products in the region of the pre-printed image.

Method for Evaluating Difference Between Other Images

The method for evaluating the difference between a plurality of print images is not limited to the above-described method. The difference between a plurality of print images may be evaluated based on a composite image of the plurality of print images, or based on a comparison between this composite image and a print image, for example. It is possible to evaluate the difference between a plurality of print images by using the degree of blurring of the composite image at each position, for example. A case will be described below, in which the evaluation unit 203 evaluates, in order to evaluate difference, blurring at each position in a composite image of a plurality of print images.

In this case, in step S302, the alignment unit 202 aligns the base image with other print images, and combines the base image and the other print images aligned with each other. Specifically, the alignment unit 202 can generate an image that has the average value of pixel values for each pixel, as a composite image. The generated composite image can be held in the main storage apparatus 104. Note that a composite image of a plurality of print images may be obtained by combining a plurality of print images except for the base image.

In addition, in step S303, the evaluation unit 203 calculates a feature amount indicating the degree of blurring of the composite image, by comparing the base image and the composite image held in the main storage apparatus 104. The method for calculating a feature amount is not particularly limited, but examples thereof include the following method. Note that a feature amount indicating the degree of blurring of the composite image may be calculated without using a base image, by performing processing on the composite image such as processing for calculating an edge amount.

a. Calculation of Feature Amount Based on Difference in Pixel Value

The evaluation unit 203 can obtain the difference in color information at corresponding positions, between a composite image of a plurality of print images and one of the plurality of print images, as a feature amount indicating the magnitude of the difference. As an example, the evaluation unit 203 can calculate the differences (Rd, Gd, Bd) at coordinates (x, y) between pixel values (Rr, Gr, Br) of the composite image and pixel values (Rm, Gm, Bm) of the base image. The largest value among the differences Rd, Gd, and Bd for the colors (R, G, B) can then be used as a feature amount. This feature amount being large at a specific pixel indicates that the difference in pixel value of this pixel between the base image and the other print image is large, in other words, the degree of blurring at this pixel of the composite image is large.

B. Calculation of Feature Amount Based on Magnitude of Edge

Figure 5A:
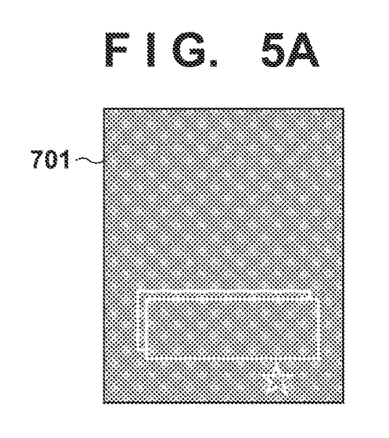
FIGS. 5A and 5B are diagrams showing an example of an edge image that is used in an embodiment of the present invention.
Figure 5B:
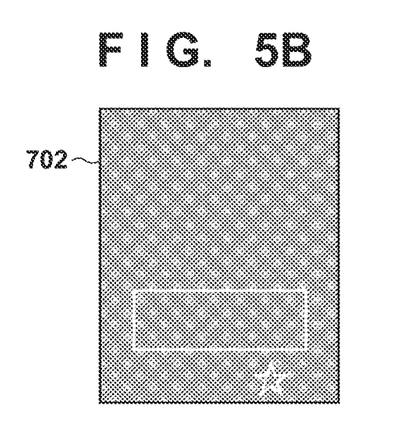

The evaluation unit 203 can obtain, as a feature amount indicating the magnitude of difference, the difference in edge amounts at corresponding positions between a composite image of a plurality of print images and one of the plurality of print images. As an example, the evaluation unit 203 can generate an edge image indicating the magnitude of an edge for each pixel by performing edge detection processing on the composite image and a base image that are compared with each other. The evaluation unit 203 can generate, respectively, from the composite image and the base image, a composite edge image 701 and a base edge image 702 such as those shown in FIGS. 5A and 5B, for example, by performing gray-scaling processing and edge detection processing that uses a Canny algorithm. The composite edge image 701 and the base edge image 702 are binarized images in which an edge portion is emphasized, and indicate a portion in which the edge amount is large and a portion in which the edge amount is small. The evaluation unit 203 then calculates a difference between a luminance value Vr of the composite edge image and a luminance value Vm of the base edge image for each pixel, and can use the calculated difference as a feature amount of the pixel. This feature amount being large at a specific pixel indicates that an edge position of the base image and an edge position of the other print image are misaligned from each other near this pixel, in other words, that the degree of blurring of the composite image at this pixel is large.

C. Generate Histograms and Compare Contrast or Degree of Distortion

The evaluation unit 203 can obtain, as a feature amount indicating the magnitude of the difference, a difference in a pixel value histogram at corresponding positions between a composite image of a plurality of print images and one of the plurality of print images. As an example, the evaluation unit 203 can generate histograms of the composite image and the base image that are compared with each other, for each of the RGB values. Such a histogram can be generated for each region at corresponding positions between the composite image and the base image. The composite image and the base image are both divided into regions of the same size, and a histogram can be generated for each of the resultant regions at corresponding positions, for example.

Figure 6A:
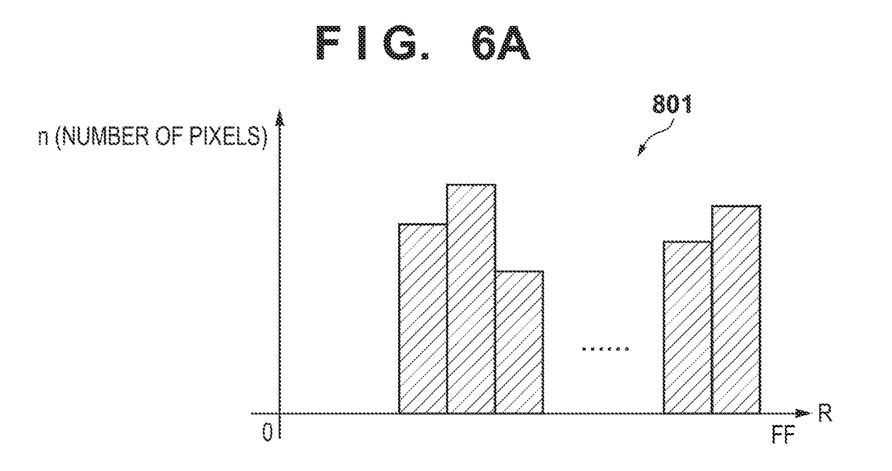
FIGS. 6A and 6B are diagrams showing an example of a histogram that is used in an embodiment of the present invention.
Figure 6B:
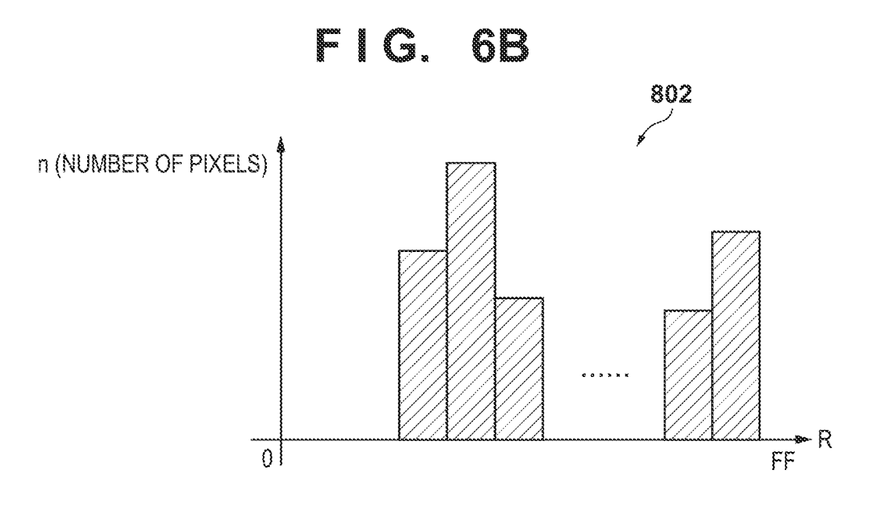

FIGS. 6A and 6B show examples of histograms of an R value for a composite image and a base image, respectively. In FIGS. 6A and 6B, the horizontal axis of the histogram indicates pixel value, and the vertical axis indicates the number of pixels. The evaluation unit 203 can calculate, as a feature amount, a difference d between the number of pixels Nr of the histogram of the composite image and the number of pixels Nm of the histogram of the base image, for each RGB value and each pixel value v. The evaluation unit 203 can use the total number of absolute values of differences d obtained for each of the RGB values and for each of the pixel values v in this manner, as a feature amount of each region. This feature amount being large at a specific region indicates that the difference in this region between the base image and the other print image is large, in other words, the degree of blurring of the composite image in this region is large.

It is conceivable that, in a blurred portion of a composite image of a plurality of print images, image variation between the print images is large. By omitting print product inspection in such a portion, it is possible to suppress over-detection of an abnormality in the print products similarly to the above embodiment.

Note that, in the above embodiment, the alignment unit 202 aligns a base image and print images with each other. However, when variation of positions of an image printed on print products is sufficiently small, and variation of positions of the print products in print images obtained through scanning is sufficiently small, alignment does not need to be performed. In this case, the evaluation unit 203 can evaluate the difference between a plurality of print images, at the same coordinates.

In the above described embodiment, inspection of print products obtained by printing an object on pre-printed sheets has been mainly described. However, a target of print product inspection in each embodiment is not limited to print products printed on pre-printed sheets. Each of a plurality of print products may include, for example, a common region in which an image common to the print products is printed by the print apparatus 190, and a variable region in which an image different between the print products is printed by the print apparatus 190. It can be said that such a variable region is a portion in which a difference in the image is likely to be detected. In this case, the evaluation unit 203 can detect a region in which a difference is present, in other words, a variable region, by evaluating difference between a plurality of print images in a similar manner. In this case, the setting unit 204 can set the variable region as an exclusion region. According to such a configuration, using a common reference image, it is possible to perform inspection of a common region of a plurality of print products.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
one or more memories storing instructions and one or more processors that execute the instructions:
to obtain a plurality of print images obtained by reading each of a plurality of print products;
to evaluate a difference between the plurality of print images;
to set an exclusion region in inspection of a print product based on a result of the evaluation; and
to obtain a difference in color information at corresponding positions between a composite image of the plurality of print images and one of the plurality of print images as a feature amount indicating the magnitude of the difference.

2. The image processing apparatus according to claim 1, wherein each of the plurality of print products includes a common object, and the one or more processors further execute the instructions to evaluate a difference between respective portions of the plurality of print images,
wherein the respective positions of the portions relative to the object are the same.

3. The image processing apparatus according to claim 1, wherein each of the print products includes a common object, and
the one or more processors further execute the instructions to align the plurality of print images to each other based on the object, and to evaluate a difference between the plurality of aligned print images.

4. The image processing apparatus according to claim 3, wherein the one or more processors further execute the instructions to evaluate a local difference between the plurality of print images at each position.

5. The image processing apparatus according to claim 4, wherein the one or more processors further execute the instructions to set a region in which the difference is greater than a predetermined criterion as the exclusion region.

6. The image processing apparatus according to claim 5, wherein each of the plurality of print products is obtained by printing the object on a medium on which an image having been printed in advance.

7. The image processing apparatus according to claim 1, wherein the one or more processors further execute the instructions to set a region where the difference is greater than a predetermined criterion as the exclusion region.

8. The image processing apparatus according to claim 1, wherein the one or more processors further execute the instructions to evaluate a difference in color information at corresponding positions between the plurality of print images in order to evaluate the difference.

9. The image processing apparatus according to claim 1, wherein the one or more processors further execute the instructions to obtain distribution of color information at corresponding positions between the plurality of print images as a feature amount indicating the magnitude of the difference.

10. The image processing apparatus according to claim 1, wherein the one or more processors further execute the instructions to evaluate blurring at each position of a composite image of the plurality of print images in order to evaluate the difference.

11. The image processing apparatus according to claim 1, wherein the one or more processors further execute the instructions to obtain a difference in edge amounts at corresponding positions between a composite image of the plurality of print images and one of the plurality of print images as a feature amount indicating the magnitude of the difference.

12. The image processing apparatus according to claim 1, wherein the one or more processors further execute the instructions to obtain a difference in pixel value histograms at corresponding positions between a composite image of the plurality of print images and one of the plurality of print images as a feature amount indicating a magnitude of the difference.

13. The image processing apparatus according to claim 1, wherein the one or more processors further execute the instructions to display the set exclusion region on a display.

14. The image processing apparatus according to claim 1, wherein the one or more processors further execute the instructions to inspect an inspection target print product such that inspection on the exclusion region is avoided.

15. The image processing apparatus according to claim 14, wherein the one or more processors further execute the instructions to inspect the print product based on a comparison of portions at corresponding positions in an image, obtained by reading the inspection target print product, and a reference image indicating an allowable print result.

16. The image processing apparatus according to claim 15, wherein the one or more processors further execute the instructions to obtain an image obtained by reading the inspection target print product as at least one print image among the plurality of print images.

17. An image processing method comprising:
obtaining a plurality of print images obtained by reading each of a plurality of print products;
evaluating a difference between the plurality of print images;
setting an exclusion region in inspection of a print product based on a result of the evaluation; and
obtaining a difference in color information at corresponding positions between a composite image of the plurality of print images and one of the plurality of print images as a feature amount indicating the magnitude of the difference.

18. A non-transitory computer-readable medium storing a program executable by a computer to perform a method comprising:
obtaining a plurality of print images obtained by reading each of a plurality of print products;
evaluating a difference between the plurality of print images;
setting an exclusion region in inspection of a print product based on a result of the evaluation; and
obtaining a difference in color information at corresponding positions between a composite image of the plurality of print images and one of the plurality of print images as a feature amount indicating the magnitude of the difference.

* * * * *